United States Patent
Segi et al.

(10) Patent No.: US 6,597,494 B2
(45) Date of Patent: Jul. 22, 2003

(54) POLARIZATION MAINTAINING OPTICAL FIBER AMPLIFIER AND OPTICAL AMPLIFIER

(75) Inventors: Takeshi Segi, Sakura (JP); Tomoharu Kitabayashi, Sakura (JP); Tetsuya Sakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/188,786

(22) Filed: Jul. 3, 2002

(65) Prior Publication Data

US 2003/0021012 A1 Jan. 30, 2003

(30) Foreign Application Priority Data

Jul. 13, 2001 (JP) .................................. 2001-214388
Aug. 27, 2001 (JP) .................................. 2001-256832

(51) Int. Cl.$^7$ ................................................ H01S 3/00
(52) U.S. Cl. ..................................... 359/341.1; 359/337
(58) Field of Search ............................. 359/337, 337.2, 359/341.1

(56) References Cited

U.S. PATENT DOCUMENTS 5,890,816 A   4/1999   Delavaux ..................... 385/11
6,268,954 B1 * 7/2001   Cheng ........................ 359/337
6,330,117 B1 * 12/2001  Seo .............................. 359/702
6,407,836 B1 * 6/2002   Fukushima ................. 359/124

FOREIGN PATENT DOCUMENTS

JP   7142798    6/1995    ............. H01S/3/10
JP   11112065   4/1999    ............. H01S/3/07

* cited by examiner

*Primary Examiner*—Mark Hellner
(74) *Attorney, Agent, or Firm*—Darby & Darby

(57) ABSTRACT

An optical fiber amplifier having improved gain and reduced noise, and an optical amplifier which restrains an unnecessary polarization component in the signal output light, maintains polarization of a signal light and performs optical amplification in which a polarizer is connected between a first optical fiber and a second optical fiber. An amplified spontaneous emission is emitted from the output end of the first fiber with the amplified signal light and is incident to the polarizer. The polarizer is disposed so as to transmit a polarization component which is parallel with the signal light. Among the different light components which are incident to the polarizer, a light having a polarization component which is orthogonal with the signal light is rejected.

17 Claims, 2 Drawing Sheets

POLARIZATION MAINTAINING OPTICAL FIBER AMPLIFIER AND OPTICAL AMPLIFIER

BACKGROUND OF THE INVENTION

1. Field of the Invention

The present invention relates to an optical amplifier of which amplifying medium is a rare earth-doped optical fiber. The present invention particularly relates to an optical fiber amplifier in which optical amplification is performed by maintaining polarization of a signal light in order that a gain can be improved and noise can be reduced. The present invention also particularly relates to an optical amplifier which can output an amplified light having superior linearly polarized light property.

2. Description of Related Art

For an optical amplifier using an optical fiber, an optical fiber amplifier of which amplifying medium is an erbium-doped optical fiber (hereinafter called EDF for short) is widely used.

When this optical amplifier is used combined with an optical unit having large polarization dependency such as optical modulator, polarization state of the light which is input to or output from such optical modulator is an important factor. In this kind of optical amplifier, linearly polarized light is used for an input light or an output light, a polarization maintaining optical amplifier is used for the purpose of maintaining polarization of the signal light. Such a polarization maintaining optical amplifier is reported in Japanese Unexamined Patent Application, First Publication No. H7-142798, Japanese Unexamined Patent Application, First Publication No. H11-112065.

In FIG. 6, a structure of a conventional optical fiber amplifier is shown. In FIG. 6, a reference numeral 1 indicates a signal light source. The signal light source 1 is connected to a light transmission path 2. This light transmission path 2 is connected to an input port of a first optical isolator 3a. At an output port of the first optical isolator 3a, an end of EDF 4 as an amplifying medium is connected.

Another end of the EDF 4 is connected to an input port of a wavelength-division-multiplexing coupler 5 (hereinafter called WDM coupler 5). To another input port of the WDM coupler 5, a pumping light source 6 is connected. To an output port of the WDM coupler 5, an input port of a second optical isolator 3b. The output port of the second optical isolator 3b is connected to an optical transmission path 2.

In an optical fiber amplifier, a pumping light from the pumping light source 6 and the signal light from the signal light source 1 are mixed by the WDM coupler 5 and input to the EDF 4, and optical amplification is performed therein. Such an amplified signal light is output to the light transmission path 2.

If a polarization maintaining optical unit and a polarization maintaining optical fiber are used for an optical unit organizing such optical fiber amplifier and an optical fiber which connects these optical units, light amplification can be performed while maintaining polarization.

However, in this optical fiber amplifier, because amplified spontaneous emission which is emitted from erbium which is doped to the EDF 4 transmits in the optical fiber; therefore, the amplified spontaneous emission is also amplified.

If population inversion at a rear end where a signal light is incident at EDF 4 becomes deteriorated due to the amplified spontaneous emission, a gain of the signal light becomes saturated; thus, it is difficult to obtain high gain. Also, because pumping light energy is used for amplifying the amplified spontaneous emission, the pumping efficiency worsens. Furthermore, population inversion at an end where signal light is incident is deteriorated, noise figure deteriorates.

Also, there is a problem that polarizing degree of the signal light deteriorates due to polarization cross talk which is caused when the number of the optical units which organize the optical amplifier and the number of the fusion splicing connection of these optical units increase.

In this kind of optical amplifier, it is not a problem if polarization state of the input signal light is an ideal linearly polarized light. However, if polarization component in which an orthogonal direction against this polarization direction is included, this unnecessary orthogonal light component is amplified; thus, unnecessary polarization light component is included in an output signal light. This means that the ratio of leaking light from the linear polarized light to an orthogonal component thereof when the linearly polarized light is incident (Such a ratio is called heareinafter a "cross talk" for short) increases and the performance of the polarization maintaining optical amplifier deteriorates.

SUMMARY OF THE INVENTION

The present invention was made in consideration of the abovementioned problems, and an object of the present invention is to provide an optical fiber amplifier which can improve gain and reduce noise figure by maintaining polarization of the signal light and amplifying it.

Another object of the present invention is to provide an optical amplifier in which light having unnecessary polarization component should not be included in the signal light.

In order to achieve abovementioned objects, a first aspect of the present invention is a polarization maintaining optical fiber amplifier which comprises an amplifying medium which is a rare earth-doped polarization maintaining optical fiber, a pumping light source which excites the rare earth-doped optical fiber, a linearly polarized light transmitting unit, wherein, the rare earth-doped optical fibers are connected in multi-stage such as two stages or more, the linearly polarized light transmitting unit which transmits linearly polarized light of either one of a slow axial directional component which is a polarization component of which transmitting speed is slow when being transmitted the polarization maintaining optical fiber, or a fast axial directional component which crosses with the slow axial directional component orthogonally and which is a polarization component of which transmitting speed is fast is disposed in at least one connected region in the rare earth-doped optical fiber.

A second aspect of the present invention is a polarization maintaining optical fiber amplifier of which linearly polarized light transmitting unit is a polarizer.

A third aspect of the present invention is a polarization maintaining optical fiber amplifier wherein a linearly polarized light transmitting unit is a polarization dependent polarization maintaining optical isolator which passes a linearly polarized light of either one in slow axial direction or in fast axial direction and does not pass a linearly polarized light of which polarization component is orthogonal to the above transmitted linearly polarized light.

A fourth aspect of the present invention is a polarization maintaining optical fiber amplifier wherein a rare earth-doped optical fiber is an erbium-doped optical fiber.

A fifth aspect of the present invention is a polarization maintaining optical fiber amplifier wherein optical units such as a rare earth-doped optical fiber, a pumping light source, and a linearly polarized light transmitting unit are connected by a polarization maintaining optical fiber.

A sixth aspect of the present invention is an optical amplifier which comprises an amplifying medium which is made of polarization maintaining optical fiber to which core a rare earth is doped, a pumping light source which excites the polarization maintaining optical fiber, a first linearly polarized light transmitting unit which is connected to an input of the polarization maintaining optical fiber, a second linearly polarized light transmitting unit which is connected to an output of the polarization maintaining optical fiber; wherein the first linearly polarized light transmitting unit transmits linearly polarized light of either one of a slow axial directional component which is a polarization component of which transmitting speed is slow when being transmitted the polarization maintaining optical fiber, or a fast axial directional component which crosses with the slow axial directional component orthogonally and is a polarization component of which transmitting speed is fast, a second linearly polarized light transmitting unit has almost same optical properties as the first linearly polarized light transmitting unit and transmits only a linearly polarized light which is transmitted through the first linearly polarized light transmitting unit. By employing such a structure, it is possible to perform an optical amplification while maintaining a linearly polarized light state of the signal light and prevent a light such as an unnecessary polarization component from being amplified.

A seventh aspect of the present invention is an optical amplifier wherein erbium is doped to the polarization maintaining optical fiber.

An eighth aspect of the present invention is an optical amplifier wherein optical units such as an amplifying medium, a pumping light source, and a linearly polarized light transmitting unit are connected by a polarization maintaining optical fiber.

A ninth aspect of the present invention is an optical amplifier wherein at least one of a first linearly polarized light transmitting unit, or a second linearly polarized light transmitting unit is a polarizer.

A tenth aspect of the present invention is an optical amplifier wherein at least one of a first linearly polarized light transmitting unit, or a second linearly polarized light transmitting unit is a polarization dependent optical isolator which transmits only either one of the linearly polarized light and does not transmit the linearly polarized light made of polarization component which is orthogonal to the above transmitted linearly polarized light.

An eleventh aspect of the present invention is an optical amplifier wherein a pumping method using a pumping light source employs any one of following pumping methods such as forward directional pumping method in which an pumped light is incident and pumped in a same direction as transmitting direction of the signal light, or backward directional pumping method in which an excited light is incident and pumped in an opposite direction to the transmitting direction of the signal light, or unilateral pumping method in which an excited light is incident and excited in both the same direction and the opposite direction of the signal light.

A twelfth aspect of the present invention is an optical amplifier wherein at least one polarization maintaining optical splitting coupler which distributes a part of an input light or an output light as a monitored light at an input of a first linearly polarized light transmitting unit or at an output of a second linearly polarized light transmitting unit. According to such a structure, it is possible to perform optical amplification while monitoring polarization state of the input light and the output light and maintain the optical power stable and output the amplified light of which linearly polarized light is maintained.

A thirteenth aspect of the present invention is an optical amplifier wherein a length of an erbium-doped polarization maintaining optical fiber is 320 m or shorter.

A fourteenth aspect of the present invention is an optical amplifier wherein an erbium-doped polarization maintaining optical fiber has two stress applying parts which are disposed in a clad which is disposed outside of a core so as to be symmetric against the core.

As explained above, according to the first embodiment of the present invention, by disposing a linearly polarized light transmitting unit which is a polarizer or a polarization dependent polarization maintaining optical isolator between two EDFs, it is possible to restrain the intensity of the amplified spontaneous emission and prevent population inversion of each EDF at a signal light incidence end from deteriorating; therefore, it is possible to realize a polarization maintaining optical fiber amplifier which can prevent the noise figure from deteriorating.

Also, because it is possible to reduce the power of the amplified spontaneous emission which is incident to the EDF by 50%, it is possible to reduce power of the excited light which is consumed for amplifying the amplified spontaneous emission; thus, it is possible to realize a polarization maintaining optical fiber amplifier which can amplify the signal light efficiently.

Furthermore, it is possible to realize a polarization maintaining optical fiber amplifier which can improve polarization cross talk which is generated while the signal light propagates optical units and connected points of each optical unit organizing an optical amplifier.

Furthermore, according to the second embodiment of the present invention, because light amplification is performed with maintaining a linearly polarized light state of the signal light by using a polarizer or a polarization dependent optical isolator; therefore, it is possible to realize an optical amplifier which can prevent a light which comprises polarization component from being amplified and to output the amplified light of which linearly polarized light state is maintained.

Also, by performing light amplification while monitoring the power of the input light and the output light via a polarization maintaining optical splitting coupler, it is possible to realize an optical amplifier which can output the amplified light of which linearly polarized light state is maintained while maintaining the optical power stable.

DETAILED DESCRIPTION OF THE INVENTION

Embodiments of the present invention are explained as follows with reference to drawings.

First Embodiment

Figure 1:
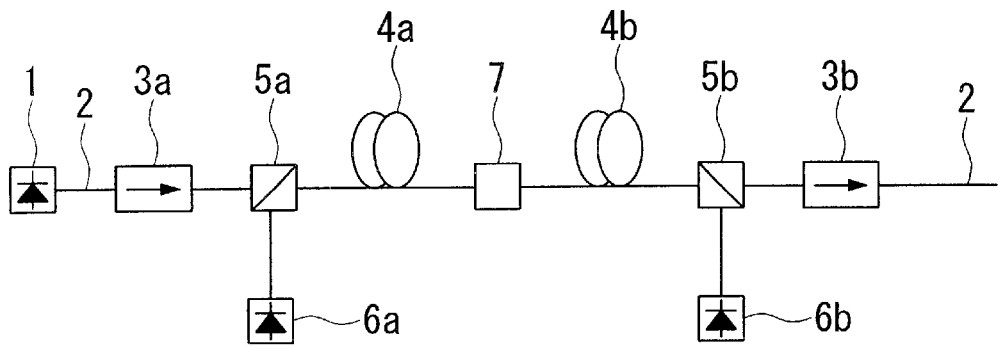
FIG. 1 is a view showing an example of a polarization maintaining optical fiber amplifier of the present invention.

FIG. 1 shows an example of polarization maintaining optical fiber amplifier of the present invention. In FIG. 1, a reference numeral 1 indicates a signal light source. The signal light source 1 is connected to a light transmission path 2. The light transmission path 2 is connected to an input port of a first optical isolator 3a. An input end of a first WDM coupler 5a is connected to an output port of a first optical isolator 3a. A first pumping light source 6a such as a laser diode is connected to another input end of the first WDM coupler 5a. An end of a first EDF 4a as an amplifying medium is connected to an output end of the first WDM coupler 5a.

The other end of the first EDF 4a is connected to a polarizer 7 which is linearly polarized light transmitting unit. The polarizer 7 is connected to an end of a second EDF 4b. The other end of the second EDF 4b is connected to an input port of the second WDM coupler 5b. A second pumping light source 6b such as an laser diode is connected to another input port of the second WDM coupler 5b. An input port of the second optical isolator 3b is connected to an output port of the second WDM coupler 5b. An output port of the second optical isolator 3b is connected to a light transmission path 2. In this example, each optical unit is connected by fusion splicing method.

A polarizer 7 is made from a glass prism or a glass plate of which reflection by polarizing angle is useful and has a function for transmitting linearly polarized light only in one polarization axial direction. In this example, a polarizer 7 is used as a linearly polarized light transmitting unit for transmitting linearly polarized light of either one of a slow axial directional component which is a polarization component of which transmitting speed is slow when transmitting the polarization maintaining optical fiber, or a fast axial directional component which crosses with the slow axial directional component orthogonally and is a polarization component of which transmitting speed is fast.

A polarization maintaining WDM coupler is used as a first WDM coupler 5a and a second WDM coupler 5b. Also, a polarization maintaining optical fiber is used for connecting an erbium-doped optical fiber and each optical unit.

For a first optical isolator 3a and a second optical isolator 3b, a polarization dependent polarization maintaining optical isolator should preferably be used. The polarization dependent polarization maintaining optical isolator is an optical isolator having optical property in which only one linearly polarized light is transmitted and a linearly polarized light made of polarization component which is orthogonal to the transmitted linearly polarized light is rejected.

Next, operation of a polarization maintaining optical fiber amplifier of this example is explained.

A signal light sent from a signal light source 1 is a linearly polarized light, and the signal light is incident in either one direction which is a slow axial direction or a fast axial direction which is orthogonal to the slow axial direction.

The signal light which transmitted the first optical isolator 3a is mixed with a pumping light which is sent from a first pumping light source 6a in a first WDM coupler 5a and is incident to a first EDF 4a. In the first EDF 4a the signal light is amplified while maintaining the linearly polarized light state of the signal light. Together with this amplification, amplified spontaneous emission which is emitted from erbium is amplified.

By doing this, amplified spontaneous emission is emitted from an emitting end of the first EDF 4a with the amplified signal light and in incident to a polarizer 7a.

A polarizer 7 is disposed so as to transmit only one polarization component which is parallel with the signal light. Between lights which are incident to the polarizer 7, a light having polarization component which is orthogonal to the signal light cannot be transmitted through the polarizer 7. Therefore, between amplified spontaneous emission, a polarization component which crosses orthogonally with the signal light is rejected; thus, it is possible to reduce the power of amplified spontaneous emission by nearly 50% while maintaining the intensity of the signal light.

The amplified signal light which accompanies with the reduced amplified spontaneous emission is incident to the second EDF 4b. In the second EDF 4b, the signal light which is mixed with the pumping light sent from the second pumping light source 6b is amplified by the second WDM coupler 5b. In the second EDF 4b, as well as the first EDF 4a, the signal light is amplified and the amplified spontaneous emission is amplified.

Here, between the amplified spontaneous emission which is generated by erbium, amplified spontaneous emission which is transmitted in opposite direction against the signal light and amplified is emitted from the signal light input end of the second EDF 4b and is transmitted through the polarizer 7. In the polarizer 7, between the amplified spontaneous emission, because polarization component which crosses orthogonally with the signal light is rejected, the power of the amplified spontaneous emission which is incident to the first EDF 4a is reduced by nearly 50%. As abovementioned, by disposing a polarizer 7 between the first EDF 4a and the second EDF 4b, it is possible to restrain the power of the amplified spontaneous emission at the signal light incident end of the EDF 4a, and prevent the population inversion from deteriorating. Accordingly, it is possible to prevent noise figure from deteriorating. Noise figure is described as a ratio between signal gain and the power of the amplified spontaneous emission. In this example of polarization maintaining optical fiber amplifier in which a polarizer 7 is used, noise figure is 4.9 dB. In contrast, in a case in which a polarizer 7 is not used, noise figure is 7.0 dB. That is, noise figure is improved by inserting the polarizer 7.

Also, by inserting the polarizer 7, because it is possible to reduce the power of the amplified spontaneous emission which is incident to the first EDF 4a and the second EDF 4b by nearly 50%, it is possible to reduce the pumping light power which is used for amplifying the amplified spontaneous emission and amplify the signal light efficiently. In an example of the polarization maintaining optical fiber amplifier using a polarizer 7, when the power of the signal input light is −2 dBm, a pumping light power which is necessary to obtain 20 dB of signal gain is 126 mW. In contrast, in a case in which a polarizer 7 is not inserted, pumping light power is necessary to be 150 mW. That is, by inserting a polarizer 7, it is observed that the excitation efficiency is improved.

Also, the signal light has polarization which is orthogonal to the polarization direction of the signal light by polarization cross talk which occurred when passing optical units such as optical isolators 3a, 3b, WDM couplers 5a, 5b, and EDFs 4a, 4b and the connected points of these optical units. A polarization cross talk is a power ratio of polarized light which leaks from the incident linearly polarized light to the incident linearly polarized light when a linearly polarized light is incident to the optical unit. By inserting a polarizer 7, it is possible to reduce the orthogonal component and improve the polarization degree.

In this example of the polarization maintaining optical fiber amplifier using a polarizer 7, polarization cross talk is −25 dB. In contrast, in a case in which a polarizer 7 is not inserted, cross talk is −15 dB. That is, by inserting a polarizer 7, it is observed that the polarization cross talk is improved.

In above explanation, EDFs are connected into two stages. When EDFs are connected into multi-stage such as more than two stages or more stages, polarizers can be disposed between stages of EDF according to necessity.

Also, instead of a polarizer, a polarization dependent polarization maintaining optical isolator may be disposed between the stages of EDF so as to transmit the light only in transmitting direction of the signal light.

Figure 2:
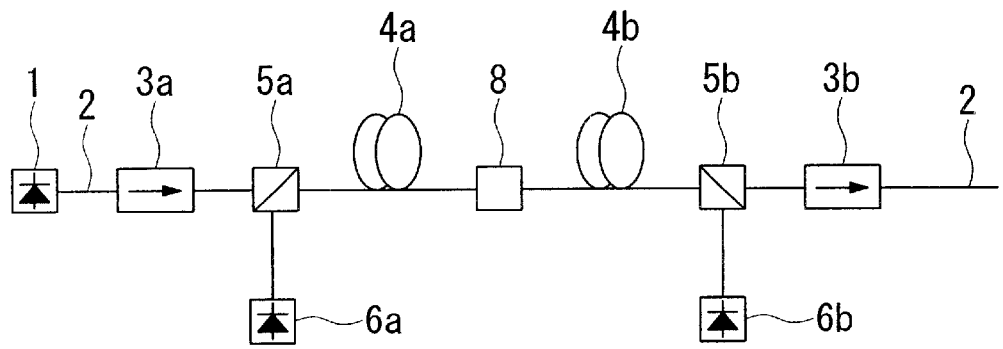
FIG. 2 is a view showing another example of a polarization maintaining optical fiber amplifier of the present invention.

In FIG. 2, an example of a polarization maintaining optical fiber amplifier in which a polarization dependent polarization maintaining optical isolator is disposed between the stages of EDF is shown.

In FIG. 2, a reference numeral 8 indicates a polarization dependent polarization maintaining optical isolator, and the polarization dependent polarization maintaining optical isolator is disposed between the first EDF 4a and the second EDF 4b. If the polarization dependent polarization maintaining optical isolator 8 is used, the amplified spontaneous emission which is emitted from the signal light input end of the second EDF 4b and transmitted to the first EDF 4a, not only a component which is orthogonal to the polarization component of the signal light but also a light component which is parallel with the polarization component of the signal light can be rejected. Accordingly, it is possible further to improve the noise figure and the excitation efficiency.

In above explanation, EDFs are connected into two stages. When EDFs are connected in multi-stage such as two stages or more stages, it is possible to dispose polarization dependent polarization maintaining optical isolator between the stages of EDF according to necessity.

Second Embodiment

The object of the second embodiment of the present invention is to connect a linearly polarized light transmitting unit to an input and an output of the optical amplifier so as to transmit any one of linearly polarized light between a slow axial direction in which propagating speed of the light is slow and a fast axial direction which crosses orthogonally with the slow axial direction and propagating speed of the light is fast, and reject the polarization component which is orthogonal to the linearly polarized light of the input signal light and prevent the light having unnecessary polarization component from being amplified.

For a linearly polarized light transmitting unit used in this embodiment, a polarizer, a polarization dependent optical isolator and the like can be used.

First of all, as an example of an optical amplifier of the present invention, an optical isolator using a polarizer as a linearly polarized transmitting unit is explained.

Figure 3:
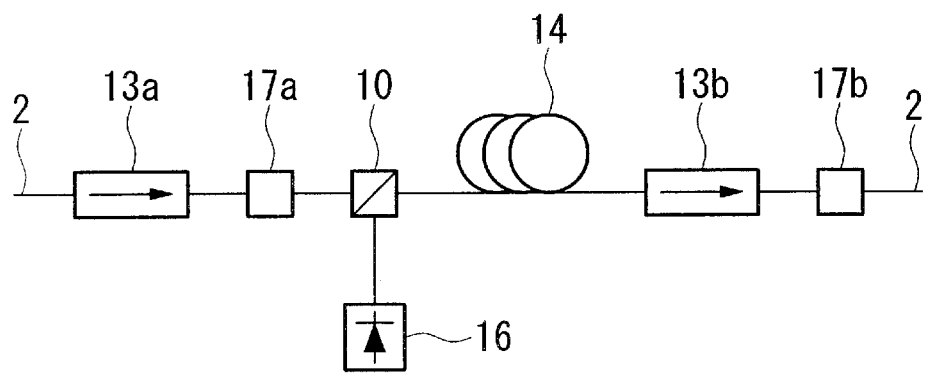
FIG. 3 is a view showing an example of an optical amplifier which uses a polarizer as a linearly polarized light transmitting unit.

In FIG. 3, a structure of an example of the optical amplifier is shown. In FIG. 3, a reference numeral 2 indicates a light transmission path. The light transmission path 2 is connected to an input port of a first optical isolator 13a. A first polarizer 17a is connected to an output port of the first optical isolator 13a. The first polarizer 17a is connected to an input port of a WDM coupler 10. A pumping light source 16 such as a laser diode is connected to another input port of the WDM coupler 10. An output port of the WDM coupler 10 is connected to an end of an EDF 14 as an amplifying medium. The other end of the EDF 14 is connected to an input port of the second optical isolator 13b. A second polarizer 17b is connected to an output port of the second optical isolator 13b. The second polarizer 17b is connected to a light transmission path 2. In the present embodiment, each optical unit is connected by fusion splicing method.

In an optical amplifier in the present embodiment, one of the signal lights which are sent from the light transmission path 2, only one linearly polarized light in either axial direction which is the slow axial direction or the fast axial direction can be transmitted through the first polarizer 17a. The polarizer 17a is made of a polarizing prism or a glass plate of which reflection by its polarizing angle is useful, and has a function for transmitting a linearly polarized light in one polarizing axial direction.

In this way, the signal light of which linearly polarized light state is maintained is coupled with the pumping light which is sent from the pumping light source 16 in the WDM coupler 10 and input to the EDF 14, amplified optically here, and output from the other end of the EDF 14 to the second polarizer 17a. In the second polarizer 17b, because only a linearly polarized light which propagates through the first polarizer 17a transmits through the second polarizer 17b, only a polarization in amplified polarization direction propagates through the second polarizer 17b and output to the light transmission path 2.

According to the optical fiber amplifier of the present embodiment, because optical amplification is performed by using a polarizer and maintaining linearly polarized light state of the signal light, it is possible to realize the optical amplifier in which a light having unnecessary polarization component is prevented from being amplified and the amplified light of which linearly polarized light state is maintained can be output.

Next, as a second example of the optical amplifier of the present invention, an optical amplifier using polarization dependent optical isolator as a linearly polarized light transmitting unit is explained. The polarization dependent optical isolator transmits a certain polarization axial direction but does not transmit a linearly polarized light having a polarization component which is in an orthogonal direction to the polarization axis.

Figure 4:
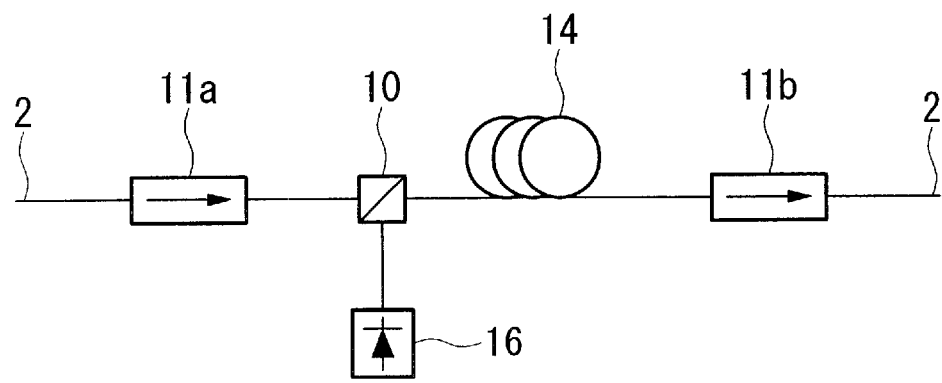
FIG. 4 is a view showing an example of an optical amplifier which uses a polarization dependent optical isolator as a linearly polarized light transmitting unit.

In FIG. 4, an optical amplifier of this example is shown. In FIG. 4, a reference numeral 2 indicates a light transmission path. The light transmission path 2 is connected to an input port of a first polarization dependent optical isolator 11a. The output port of the first optical isolator 11a is connected to an input port of a WDM coupler 10. A pumping light source 5 is connected to the other input port of the WDM coupler 10. An output port of the WDM coupler 10 is connected to an end of an EDF 14 as an amplifying medium. The other end of the EDF 14 is connected to an input port of a second polarization dependent optical isolator 11b. An output port of the second polarization dependent optical isolator 11b is connected to the light transmission path 2. In this example, each optical unit is connected by a fusion splicing method.

In this example of the optical amplifier, among the signal lights which are sent from the light transmission path 2, only a linearly polarized light in only one axial direction of the slow axial direction or the fast axial direction can be transmitted through the first polarization dependent optical isolator 11a.

In this way, the signal light of which linearly polarized light state is maintained is mixed with the pumping light which is sent from the pumping light source 16 in the WDM coupler 10, input to the EDF 14, amplified optically here, and output from the other end of the EDF 14 to the second polarization dependent optical isolator 11b. In the second polarization dependent optical isolator 11b, because only a linearly polarized light which is transmitted through the first polarization dependent optical isolator 11a transmits therethrough, only a polarization in amplified polarization direction can be transmitted through the second polarization dependent optical isolator 11b and output to the light transmission path 2.

According to the optical amplifier of this example, because optical amplification is performed by using a polarization dependent optical isolator and maintaining a linearly polarized light state of the signal light, it is possible to realize an optical amplifier in which a light having unnecessary polarization component is prevented from being amplified and an amplified light of which linearly polarized light state is maintained can be output.

Next, as a third example of an optical amplifier of the present invention, an optical amplifier using a splitting coupler and monitoring the power of the input light and the output light and performing optical amplification is explained.

Figure 5:
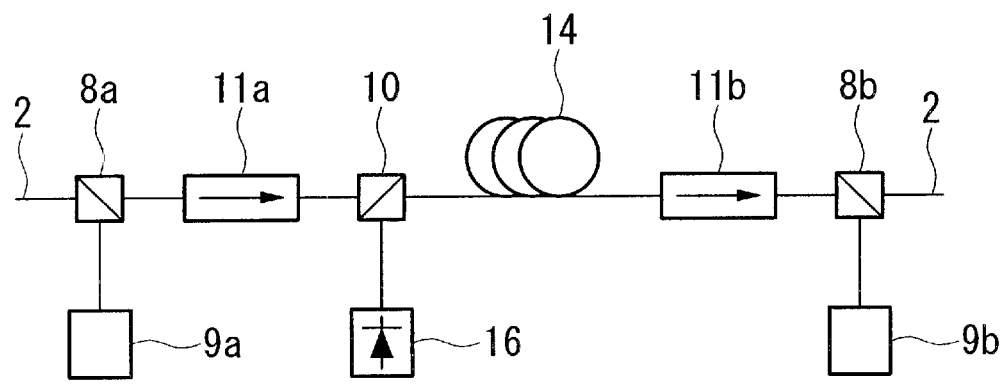
FIG. 5 is a view showing an example of an optical amplifier performing optical amplification by monitoring the input light and the output light by using a splitting coupler.
Figure 6:
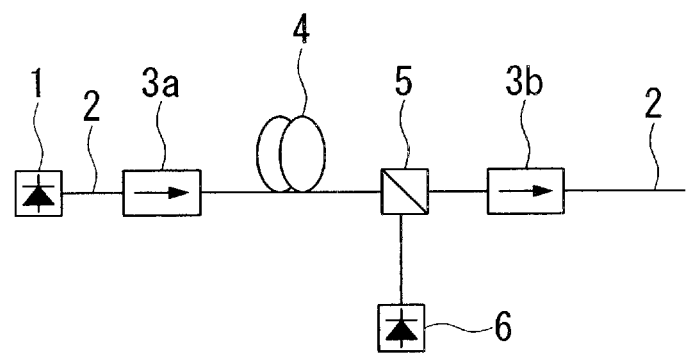
FIG. 6 is a view showing a conventional optical fiber amplifier.

In FIG. 5, an optical amplifier of this example is shown. In FIG. 5, a reference numeral 2 indicates a light transmission path. The light transmission path 2 is connected to an input port of a polarization maintaining optical splitting coupler 8a. A first optical detector 9a is connected to the other output port of the first polarization maintaining optical splitting coupler 8a.

An input port of the first polarization dependent optical isolator 11a is connected to the other output port of the first polarization maintaining optical splitting coupler 8a. An output port of the first optical isolator 11a is connected to an input port of the WDM coupler 10. A pumping light source 16 is connected to the other input port of the WDM coupler 10. An output port of the WDM coupler 10 is connected to an end of an EDF 14 as an amplifying medium.

The other end of the EDF 14 is connected to an input port of a second polarization dependent optical isolator 11b. An output port of the second polarization dependent optical isolator 11b is connected to an input port of the second polarization maintaining optical splitting coupler 8b. A second optical detector 9b is connected to an output port of the second polarization maintaining optical splitting coupler 8b, the other output port of the second polarization maintaining optical splitting coupler 8b is connected to the light transmission path 2. In this example, each optical unit is connected by a fusion splicing method.

Although it is similar with the above second example that a linearly polarized light state is maintained and an amplified signal light is output by polarization dependent optical isolators 11a and 11b, in an optical amplifier in this example, the power of input light and output light are monitored by the first optical detector 9a and the second optical detector 9b via the polarization maintaining optical splitting couplers 8a and 8b. In this example, because an optical splitting coupler is polarization maintaining type, a polarization of the input light and the output light to be monitored is maintained.

In case in which non-polarization maintaining optical splitting coupler is used, due to loss which depends on the polarization, the power of the light to be monitored which is incident to the optical detector changes, or sensitivity of the optical detector differs according the polarization state; therefore, it is impossible to monitor the power of light stably. In an optical amplifier in this example, by monitoring via a polarization maintaining optical splitting coupler, it is possible to remove influences to a loss depending on the polarization and sensitivity of the detector; thus, it is possible to monitor the power of light stably.

According to an optical fiber amplifier of this example, by performing optical amplification while monitoring the power of input light and output light via a polarization maintaining optical splitting coupler, it is possible to realize an optical amplifier which can output the amplified light of which linearly polarized light state is maintained while maintaining the light power stably.

Length of an erbium-doped polarization maintaining optical fiber should preferably be 320 m or shorter. Also, an erbium-doped polarization maintaining optical fiber should be a fiber having two stress applying parts (hereinafter called PANDA fiber) which are disposed symmetrically toward a core in a clad which is outside of the core.

Practical level of cross talk of PANDA fiber is −25 dB/100 m or less. On the other hand, in general, cross talk of polarization maintaining optical unit is limited to −20 dB or less. The length of a fiber of which cross talk level is equivalent to −20 dB is 320 m. Therefore, if an erbium-doped PANDA fiber is used as an optical amplifying unit, the length of PANDA fiber should preferably be 320 m or shorter.

Also, for a polarization maintaining optical fiber, although a Bow-tie fiber or an elliptical core fiber can be named, a PANDA fiber is known commonly. When a PANDA fiber is connected by a fusion splicing method, because adjustment of polarization axis is performed optically viewing a fiber horizontally, it is possible to perform fusion splicing connection of PANDA fiber such as a lead fiber for various optical units easily with low loss by using a rare earth-doped PANDA type optical fiber.

In above examples of an optical amplifier, the optical fiber which connects each optical unit should preferably be a polarization maintaining optical fiber.

Regarding an optical amplifying medium, as an example, a case in which an EDF is used is explained. However, an optical amplifying medium is not limited to an EDF, other rare earth-doped optical fiber having optical amplifying function may be used.

Also, regarding a pumping method, in FIGS. 3, 4, and 5, a forward directional pumping method is explained in which a pumping light is incident in a same direction as a passing direction of the signal light and excited. Pumping methods are not limited to such a case and backward directional pumping method in which a pumping light is incident in an opposite direction to a passing direction of the signal light and excited is also possible to be employed. Also, a bilateral pumping method in which a pumping light is incident both in a signal light passing direction and in a opposite direction to the signal light passing direction and pumping erbium.

Also, an isolator, a polarizer, and a WDM coupler are not limited to the case of being built in as individual units. That is, it is possible to unite these units into one unit and assemble it as an optical composite module.

EXPERIMENTAL EXAMPLE

An experimental example of the present invention is shown as follows. An optical amplifier having a structure shown in FIG. 4 is manufactured using a polarization dependent optical isolator. For a pumping light source, a laser diode which emits pumping light of which wavelength is 1480 nm is used.

Wavelength of the signal light is 1550 nm. Input signal power is −13 dBm. Output signal power is +4.5 dBm. Power of input light $P_s$ of the polarization maintaining optical fiber in slow axial direction is −13.5 dBm. Power of input light Pf in fast axial direction is −23.0 dBm.

As far as an optical amplifier which is manufactured in this way is concerned, effect of rejecting unnecessary polarization component which is included in the output signal light is examined by comparing to a case in which a polarization Independent optical isolator is used. Optical property of the optical unit which is used in this experiment is shown in TABLE 1.

|  | Factor to be examined | Property (dB) |
| --- | --- | --- |
| polarization Independent isolator | Cross talk | −25 |
| polarization dependent isolator | Extinction ratio | −20 |
| WDM coupler | Cross talk | −25 |
| EDF coil | Cross talk | −25 |

In a case in which a polarization Independent optical isolator is used, power of unnecessary polarization component which is included in the output signal light is −24.7 dBm. In contrast, in an optical amplifier of the present invention using a polarization dependent optical isolator, power of unnecessary polarization component which is included in the output signal light is −36.8 dBm.

According to above results, it is observed that the power of unnecessary polarization component which is included in the output signal light is restrained by more than 12.1 dB by an optical amplifier using a polarization dependent optical isolator; thus, it is confirmed that it is effective to use an polarization dependent optical isolator in order to obtain an amplified light of which linearly polarized light state is maintained. Such result is witnessed in a case in which a polarizer is used.

Here, in this experimental example, although the wavelength of the pumping light is 1480 nm, a pumping light having other wavelength such as 980 nm may be used.

What is claimed is:

1. A polarization maintaining optical fiber amplifier comprising:

an amplifying medium of a rare earth-doped polarization maintaining optical fiber;

a pumping light source which excites the rare earth-doped optical fiber; and a linearly polarized light transmitting unit which transmits linearly polarized light of either one of a slow axial directional component which is a polarization component of which the propagating speed is slow when propagating the polarization maintaining optical fiber, or a fast axial directional component which crosses with the slow axial directional component orthogonally and is a polarization component of which the transmitting speed is fast to at least one connected region in the rare earth-doped optical fiber.

2. A polarization maintaining optical fiber amplifier according to claim 1 wherein the linearly polarized light transmitting unit is a polarizer.

3. A polarization maintaining optical fiber amplifier according to claim 1 wherein a linearly polarized light transmitting unit is a polarization dependent polarization maintaining optical isolator which transmits a linearly polarized light of either one in slow axial direction or in fast axial direction and does not transmit a linearly polarized light of which polarization component is orthogonal to the above transmitted linearly polarized light.

4. A polarization maintaining optical fiber amplifier according to claim 1 wherein the rare earth-doped optical fiber is an erbium-doped fiber.

5. A polarization maintaining optical fiber amplifier according to claim 1 wherein an optical unit comprises a rare earth-doped optical fiber, a pumping light source, and a linearly polarized light transmitting unit connected to the a polarization maintaining optical fiber.

6. An optical amplifier comprising:

an amplifying medium of a polarization maintaining optical fiber having a core doped with a rare earth;

a pumping light source which excites the polarization maintaining optical fiber;

a first linearly polarized light transmitting unit which is connected to an input of the polarization maintaining optical fiber that transmits linearly polarized light of either one of a slow axial directional component which is a polarization component of which the propagating speed is slow when propagating in the polarization maintaining optical fiber, or a fast axial directional component which crosses with the slow axial directional component orthogonally and is a polarization component of which the propagating speed is fast; and a second linearly polarized light transmitting unit which is connected to an output of the polarization maintaining optical fiber having substantially the same optical properties as the first linearly polarized light transmitting unit that transmits only a linearly polarized light which is transmitted through the first linearly polarized light transmitting unit.

7. An optical amplifier according to claim 6 wherein the polarization maintaining optical fiber is erbium-doped.

8. An optical amplifier according to claim 6 wherein optical units such as an amplifying medium, a pumping light source, and a linearly polarized light transmitting unit are connected by a polarization maintaining optical fiber.

9. An optical amplifier according to claim 6 wherein at least one of the first linearly polarized light transmitting unit and the second linearly polarized light transmitting unit is a polarizer.

10. An optical amplifier according to claim 6 wherein at least one of the first linearly polarized light transmitting unit and the second linearly polarized light transmitting unit is a polarization dependent optical isolator which transmits in addition to the transmitted linearly polarized light only either one of linearly polarized light and linearly polarized light having a polarization component which is orthogonal to the above transmitted linearly polarized light.

11. An optical amplifier according to claim 6 wherein the pumping light source operates to pump light by one of:

forward directional pumping in which a pumping light is incident and excites the erbium in the same direction as the transmitting direction of the signal light;

backward directional pumping in which an excited light is incident and excited in an opposite direction to the transmitting direction of the signal light; and bidirectional pumping in which an excited light is incident and excites the erbium in both the same direction and the opposite direction of the signal light.

12. An optical amplifier according to claim 6 further comprising:

a polarization maintaining optical splitting coupler which distributes a part of input light or output light as a monitoring light at at least one of an input of the first linearly polarized light transmitting unit or at an output of the second linearly polarized light transmitting unit.

13. An optical amplifier according to claim 7 wherein a length of an erbium-doped polarization maintaining optical fiber is ≦320 m.

14. An optical amplifier according to claim 6 wherein the erbium-doped polarization maintaining optical fiber has two stress applying parts which are disposed in a clad which is disposed outside of a core so as to be symmetric against the core.

15. A polarization maintaining optical fiber amplifier according to claim 1 having an output to which is connected a polarizer having an output connected to the input of a second polarization maintaining optical fiber amplifier.

16. A polarization maintaining optical fiber amplifier according to claim 1 further comprising a pumping light source which excites the rare earth-doped optical fiber according to one of a backward directional pumping method and a bilateral pumping method.

17. An optical amplifier according to claim 6, further comprising a pumping light source which excites the rare earth-doped optical fiber according to one of a backward directional pumping method and a bilateral pumping method.

* * * * *